United States Patent [19]
DeMarche et al.

[11] Patent Number: 5,397,217
[45] Date of Patent: Mar. 14, 1995

[54] PULSE-COOLED GAS TURBINE ENGINE ASSEMBLY

[75] Inventors: Thomas E. DeMarche, Boxford, Mass.; Mario E. Abreu, San Diego, Calif.

[73] Assignee: General Electric Company, Cincinnati, Ohio

[21] Appl. No.: 980,832

[22] Filed: Nov. 24, 1992

[51] Int. Cl.⁶ .................... F01D 5/18; F01D 9/02
[52] U.S. Cl. .................... 416/97 R; 415/115
[58] Field of Search ............. 416/95, 96 R, 97 R; 415/115, 116; 60/39.03, 39.75

[56] References Cited

U.S. PATENT DOCUMENTS

| | | |
|---|---|---|
| Re. 33,605 | 6/1991 | Bauer . |
| 3,651,639 | 3/1972 | Black . |
| 4,250,799 | 2/1981 | Stouffer . |
| 4,581,887 | 4/1986 | Scheffler et al. ............ 415/116 |
| 4,976,311 | 12/1990 | Kurzweg . |
| 5,029,440 | 7/1991 | Graber et al. . |
| 5,190,099 | 3/1993 | Mon ......................... 165/104.33 |

OTHER PUBLICATIONS

F. D. Yeaple, "Fluid Amplifiers Go Commercial," *Hydraulic and Pneumatic Power and Control Design, Performance, Application,* 1966, pp: cover, copyright, 166–168.

R. E. McClelland, "An Investigation of Convection Cooling of Small Gas Turbine Blades Using Intermittment Cooling Air," Aug. 29, 1988, U.S. TACOM Report No. 13394, full report.

*Primary Examiner*—Edward K. Look
*Assistant Examiner*—James A. Larson
*Attorney, Agent, or Firm*—Jerome C. Squillaro; Nathan D. Herkamp

[57] ABSTRACT

A pulse-cooled gas turbine engine assembly includes a hollow airfoil and a fluidic oscillator joined thereto. The fluidic oscillator discharges pressurized cooling air inside the airfoil at a predetermined pulsation frequency for cooling the airfoil.

8 Claims, 4 Drawing Sheets

PULSE-COOLED GAS TURBINE ENGINE ASSEMBLY

The present invention relates generally to gas turbine engines, and, more specifically, to cooling of rotor and stator parts such as rotor blades, and stator vanes and shrouds.

BACKGROUND OF THE INVENTION

A gas turbine engine includes a compressor for pressurizing ambient air which is then mixed with fuel in a combustor and ignited for generating combustion gases which flow through a turbine which extracts energy therefrom. The turbine includes stator vanes which preferentially channel the combustion gases through a row of rotor blades which in turn rotate a rotor disk for providing shaft power. Since the combustion gases are hot, the stator vanes and the rotor blades are typically internally cooled using a portion of the compressed air bled from the compressor.

More specifically, the vanes and blades typically include a hollow airfoil having an internal cooling flow channel through which is channeled the cooling air bled from the compressor for internally cooling the airfoil. Convective heat transfer cooling is typically enhanced by providing a variety of techniques, including tubulators within the airfoil which have various conventional forms. The cooling air may simply be channeled through the airfoils, or the airfoils may include trailing edge discharge apertures or film cooling holes along either the pressure or suction sides of the airfoil, or both, in accordance with conventional practice. These outlets discharge the cooling air from the airfoil directly into the combustion gases and are suitably sized to provide a minimum backflow pressure margin to prevent the combustion gases from flowing into the airfoils through these outlets.

Any compressed air which is not used for generating combustion gases, such as that used for cooling the airfoils, decreases the overall operating efficiency of the engine and, therefore, increases specific fuel consumption (SFC). Accordingly, airfoils are cooled by a myriad of different arrangements which attempt to maximize the cooling thereof while minimizing the amount of cooling air bled from the compressor. This must also be done while maintaining acceptable backflow margin and without undesirable pressure losses which decrease the efficiency thereof.

One advanced concept for cooling gas turbine engine airfoils simulates the airfoils in a laboratory environment and uses a rotating chopper to provide pulsed or intermittent flow for convection cooling. The simulation demonstrates that convective heat transfer coefficients may be increased using pulsed flow over steady flow for constant airflow; however, the mechanical assembly of moving parts used in the test are clearly impractical for use in a gas turbine engine such as one used for powering an aircraft in flight.

SUMMARY OF THE INVENTION

A pulse-cooled gas turbine engine assembly includes a hollow part and a fluidic oscillator joined thereto. The fluidic oscillator discharges pressurized cooling air inside the part at a predetermined pulsation frequency for cooling the part.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
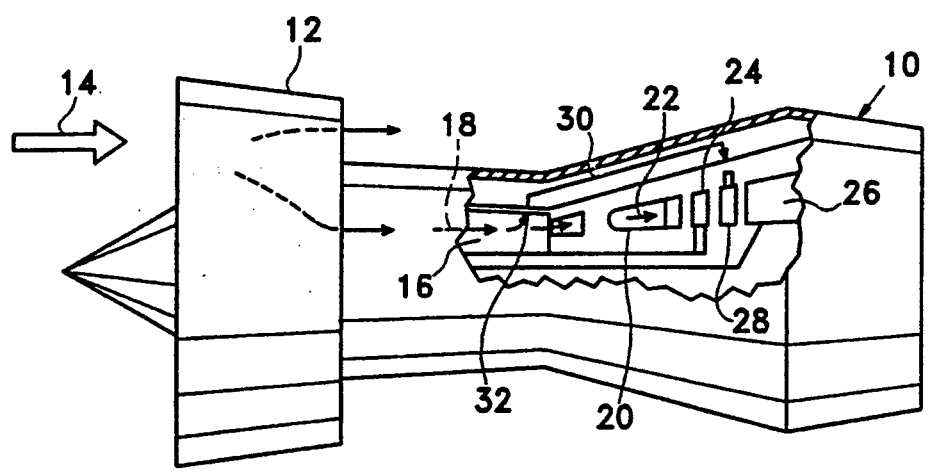
FIG. 1 is an axial, schematic view of an exemplary gas turbine engine having a turbine stator row including airfoils pulse-cooled in accordance with one embodiment of the present invention.

Illustrated schematically in FIG. 1 is an exemplary turbofan gas turbine engine 10 for powering an aircraft in flight. The engine 10 includes a conventional fan 12 which receives ambient airflow 14, the outer portion of which is used to provide thrust for propelling the aircraft in flight, and the inner portion of which is channeled into a conventional compressor 16. The compressor 16 compresses the air 14 for forming pressurized air 18 which is channeled into a conventional combustor 20 wherein it is mixed with fuel and ignited for generating combustion gases 22. The combustion gases 22 flow in turn through a conventional high pressure turbine (HPT) 24 and a conventional low pressure turbine (LPT) 26 which extract energy therefrom. Each of the turbines 24, 26 includes a stator nozzle disposed upstream of a rotor blade row thereof, such as a first stage low pressure (LP) stator nozzle 28 disposed between the HPT 24 and the LPT 26.

In accordance with one embodiment of the present invention, a portion of the pressurized compressor air 18 is bled therefrom through a conventional conduit or duct 30 to cool airfoils disposed downstream of the combustor 20, with the bled compressed cooling air being designated 32.

Figure 2:
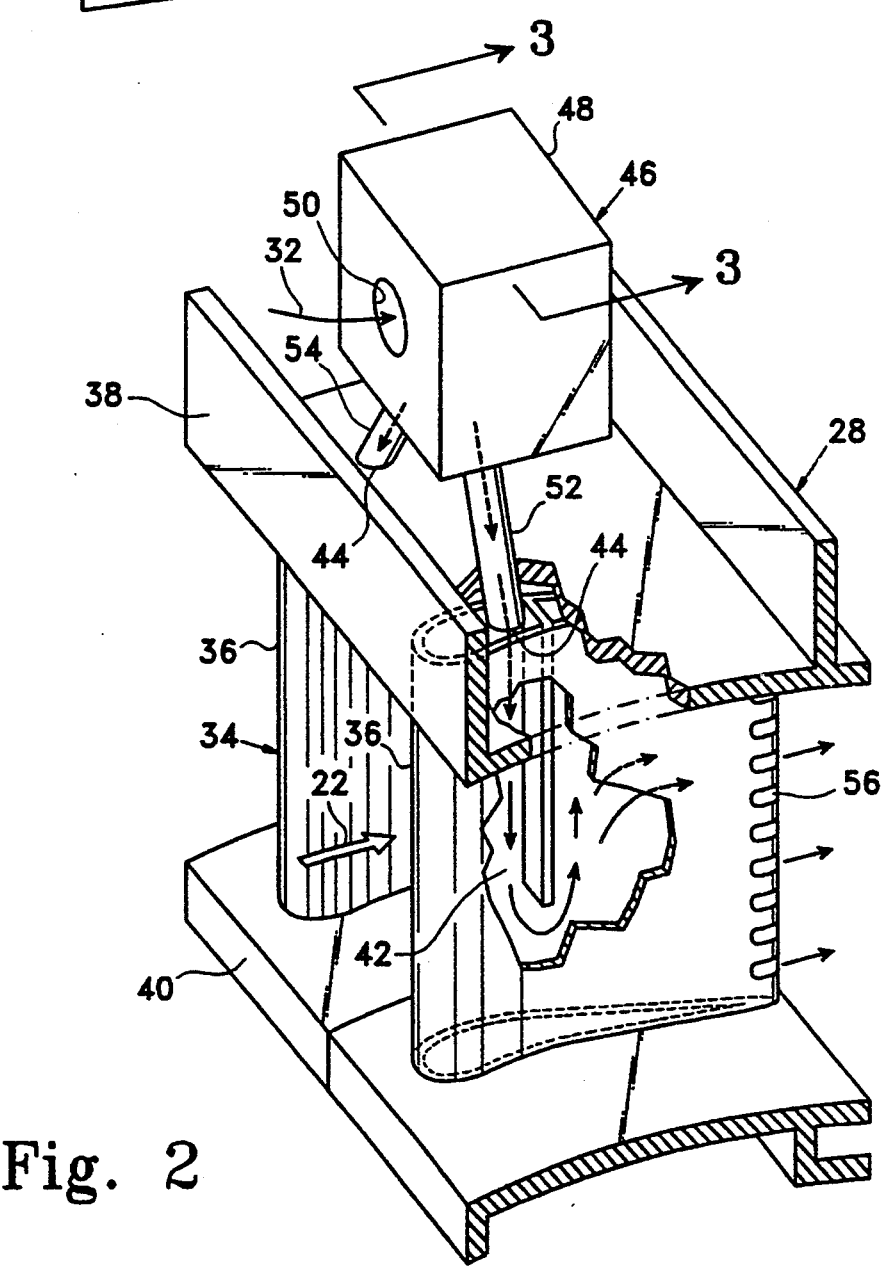
FIG. 2 is a perspective, schematic view of a portion of the stator row illustrated in FIG. 1 having a fluidic oscillator in accordance with one embodiment of the present invention.

Illustrated in FIG. 2 is a portion of the LP stator nozzle 28 which is cooled in accordance with one embodiment of the present invention. The nozzle 28 includes a plurality of circumferentially spaced apart stator vanes 34 conventionally joined together to form a ring. Each of the vanes 34 includes a hollow airfoil 36 joined to a radially outer band 38 and to a radially inner band 40. Each airfoil 36 includes an internal cooling flow channel 42 having an inlet 44 extending through the outer band 38 for receiving the cooling air 32 for flow through the airfoil 36. The flow channel 42 may have any conventional form including parallel, radially extending portions, or may be a single serpentine flow channel. The inside of the airfoil 36 may include conventional turbulators as desired, although in the preferred embodiment of the invention, no turbulators are used therein and the inside walls of the airfoil 36 are smooth.

In accordance with one embodiment of the present invention, a fluidic oscillator 46 is provided for channeling the cooling air 32 to the airfoil 36, with the oscillator 46 being motionless in the sense that it contains no moving parts for oscillating the cooling air 32 therethrough. More specifically, and referring also to FIG. 3, the oscillator 46 includes a housing 48 having an inlet 50 which first receives the cooling air 32 from the duct 30 shown in FIG. 1. The duct 30 may be directly connected in flow communication with the inlet 50, or may simply discharge the cooling air 32 into a common plenum surrounding the oscillator 46 which is pressurized by the cooling air 32 for flow into the inlet 50. The oscillator 46 has at least one outlet, and in the preferred embodiment illustrated in FIG. 2 has first and second outlets 52 and 54, respectively. The outlets 52, 54 are in the exemplary form of tubes disposed in flow communication with the respective airfoil flow channel inlets 44 for intermittently discharging thereto the cooling air 32 with a predetermined pulsation frequency thereof for cooling the airfoils 36. By using the oscillator 46 to pulse the cooling air 32 at the pulsation frequency instead of a continuous flow thereof without pulsation, an improved convective heat transfer coefficient may be obtained for more efficiently cooling the airfoil 36.

The cooling air 32 channeled through the airfoil 36 is suitably discharged therefrom through a plurality of outlets such as trailing edge cooling outlets 56 for example. The trailing edge outlets 56 extend through the airfoil 36 at its trailing edge in flow communication with the internal flow channel 42 for discharging the pulsed cooling air 32 therefrom and into the combustion gases 22 which flow between and over the airfoils 36. The outlets 56 could also be in the form of conventional film cooling holes extending through either or both of the pressure or suction sides of the airfoil 36 as is conventionally known.

However, the outlets 56 must be provided with air from the flow channel 42 at a minimum pressure thereof to ensure that the cooling air 32 is always discharged outwardly through the outlets 56 into the combustion gases 22 without backflow of the combustion gases 22 through the outlets 56 and inside the airfoil 36. Each of the outlets 56 is sized for a particular design application for providing a predetermined pressure drop thereacross between the flow channel 42 and the outside of the airfoil 36, and the oscillator 46 is sized and configured for providing a predetermined pulsation frequency of the cooling air 32 inside the airfoil 36 selected to prevent bleed-down of the pressure of the cooling air 32 in the flow channel 42 below a predetermined backflow margin. Backflow margin represents the pressure of the cooling air 32 inside the airfoil 36 relative to the pressure of the combustion gases 22 outside of the airfoil 36 and is suitably greater than 1.0 to ensure constant outward flow of the cooling air 32 from the outlet 56. Backflow margin is conventionally known, but an airfoil such as the stator airfoil 36 is conventionally provided with a continuous supply of air at a substantially continuous pressure. Since the oscillator 46 oscillates or pulses the cooling air 32 into the airfoil 36, its pressure is also oscillated, and, therefore, this oscillation of pressure must be accommodated to ensure an acceptable level of backflow margin.

In the preferred embodiment illustrated in FIG. 2, the fluidic oscillator 46 includes both outlets 52 and 54, with each outlet 52 and 54 being joined in flow communication with only a respective one of adjacent airfoils 36. The stator nozzle 28 includes a substantial number of the airfoils 36 with each two adjacent airfoils 36 having a respective fluidic oscillator 46 joined thereto. In this configuration, the common fluidic oscillator 46 for airfoil pairs may be sized and configured for alternately channeling the cooling air 32 to the two adjacent airfoils 36 at the pulsation frequency.

Figure 3:
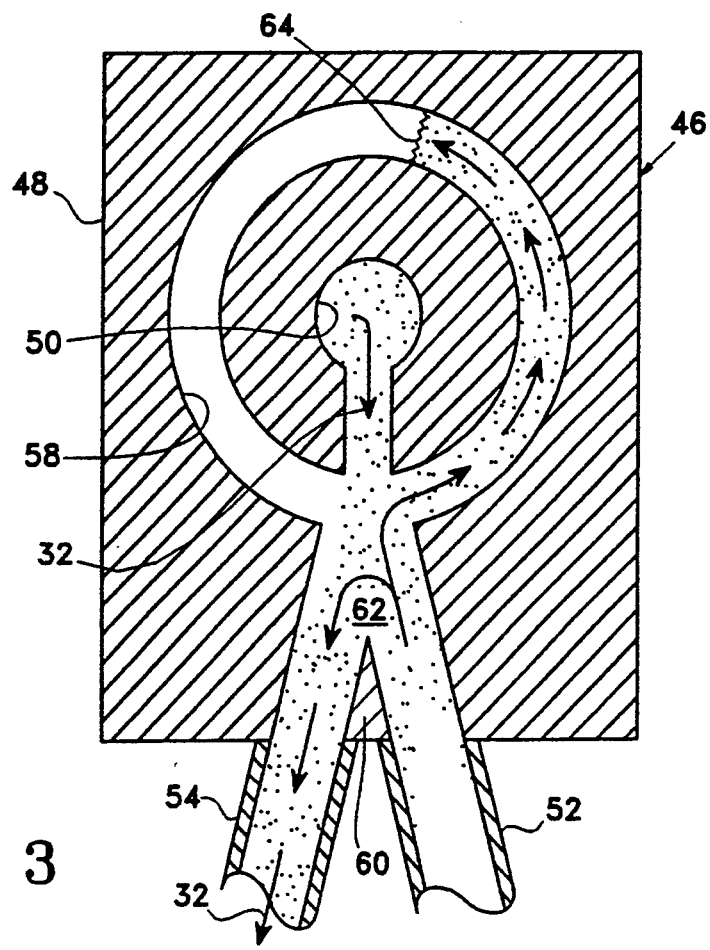
FIG. 3 is a section through the fluidic oscillator illustrated in FIG. 2 viewed along line 3—3.

More specifically, and referring to FIG. 3, the fluidic oscillator 46 further includes an annular, or circular, feedback loop or flow channel 58 disposed in flow communication between the inlet 50 and the first and second outlets 52 and 54. A flow splitter 60 is disposed at the juncture of the first and second outlets 52 and 54 and the feedback flow channel 58. The first and second outlets 52 and 54 converge together at an acute included angle therebetween at the flow splitter 60 to form a common switching zone 62 which includes a portion of the circular flow channel 58, with the inlet 50 being positioned for discharging the cooling air 32 into the switching zone 62 toward the splitter 60 for effecting alternating flow between the first and second outlets 52 and 54 at the pulsation frequency. The operation of the fluidic oscillator 46 illustrated in FIG. 3 is conventional, with a portion of the cooling air 32 alternately flowing either clockwise, or counterclockwise as shown, in the feedback channel 58 with a shockwave 64 at its front which alternately moves along the feedback channel 58 until it contacts the main stream of the cooling air 32 channeled into the switching zone 62. When the shockwave 64 contacts this air, it switches the cooling air 32 to flow through the opposite outlet which interrupts flow to the first outlet. As shown in FIG. 3, the cooling air 32 is flowing in one cycle solely through the second outlet 54 to the respective airfoil 36, with the flow of the cooling air 32 being interrupted through the first outlet 52 to the adjacent airfoil 36. When the shockwave 64 completes its counterclockwise travel and impacts the main cooling air 32, the cooling air 32 changes its discharge path from the second outlet 54 to the first outlet 52 which will then initiate flow of a portion of the cooling air 32 clockwise in the feedback channel 58 for the next cycle. As the shockwave 64 alternately moves clockwise and counterclockwise in the feedback channel 58, the cooling air 32 flowing from the inlet 50 and into the switching zone 62 alternates its discharge flowpath through the first or second outlet 52 and 54. In this way, not only is the cooling air 32 pulsed into each of the two adjacent airfoils 36, but, the cooling air 32 is alternately channeled into the two airfoils 36 so that the single supply of cooling air 32 into the individual fluidic oscillator 46 is shared between the adjacent airfoils 36. Accordingly, a suitable convective heat transfer coefficient may be obtained inside each of the airfoils 36 by pulsing the flow thereto as well as by sharing the flow for more efficiently utilizing the cooling air 32 channeled through the oscillator 46.

Figure 4:
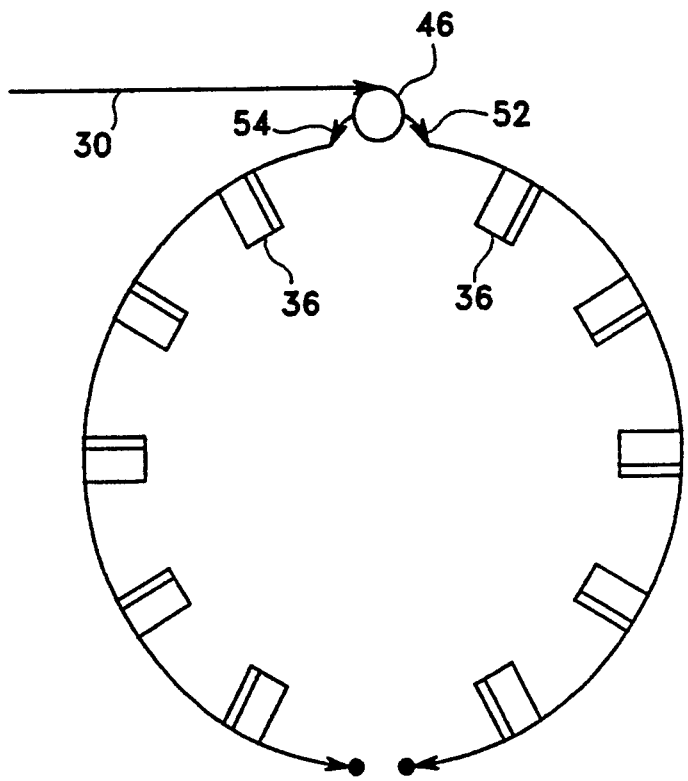
FIG. 4 is a schematic representation of the stator row illustrated in FIG. 1 in accordance with another embodiment of the present invention.

Illustrated schematically in FIG. 4 is another embodiment of the present invention wherein the first and second outlets 52 and 54 of the fluidic oscillator 46 are in the form of arcuate manifolds, with each manifold extending about 180° around the circumference of the engine, and with each manifold also being disposed in parallel flow communication with a plurality of stator parts such as the airfoils 36 shown, or shrouds or shroud supports (not shown). In this way, a single fluidic oscillator 46 may be suitably sized for discharging the cooling air 32 therefrom with a suitable total flow rate which is divided between the several airfoils 36 joined to each manifold.

Figure 5:
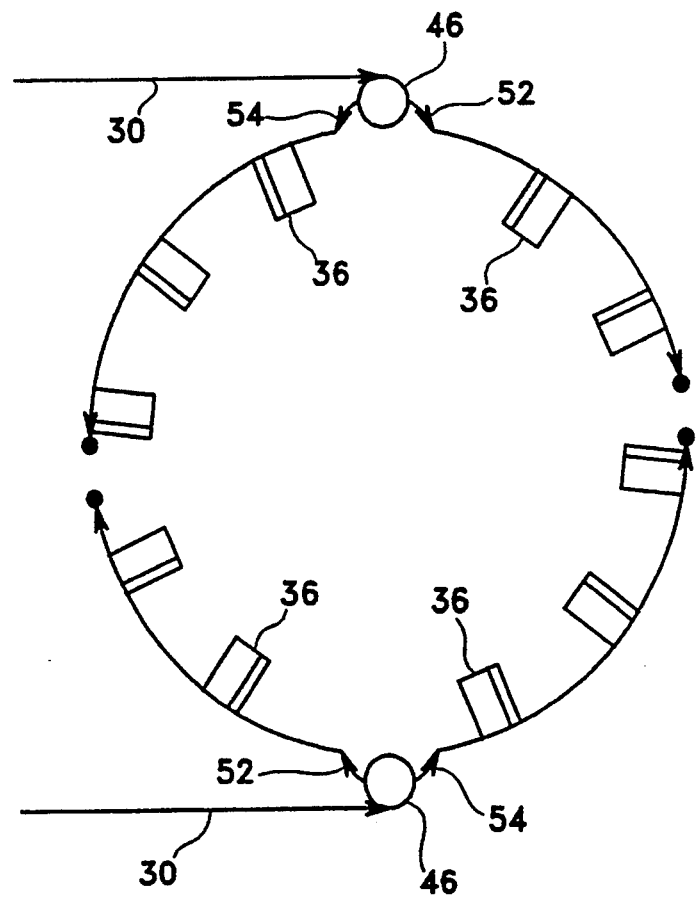
FIG. 5 is a schematic representation of the stator row illustrated in FIG. 1 in accordance with another embodiment of the present invention.

FIG. 5 illustrates schematically yet another embodiment of the present invention including two fluidic oscillators 46 wherein the first and second outlets 52 and 54 are again in the form of arcuate manifolds, with each manifold extending about 90° around the circumference of the engine and being disposed in parallel flow with respective pluralities of the stator parts such as the airfoils 36. The FIG. 5 embodiment of the invention provides a shorter circumferential flowpath between the fluidic oscillator 46 and the end of each respective manifold outlet 52, 54 to ensure a suitable supply of the cooling air 32 to all of the airfoils 36 without unacceptable bleed down thereof during operation.

Figure 6:
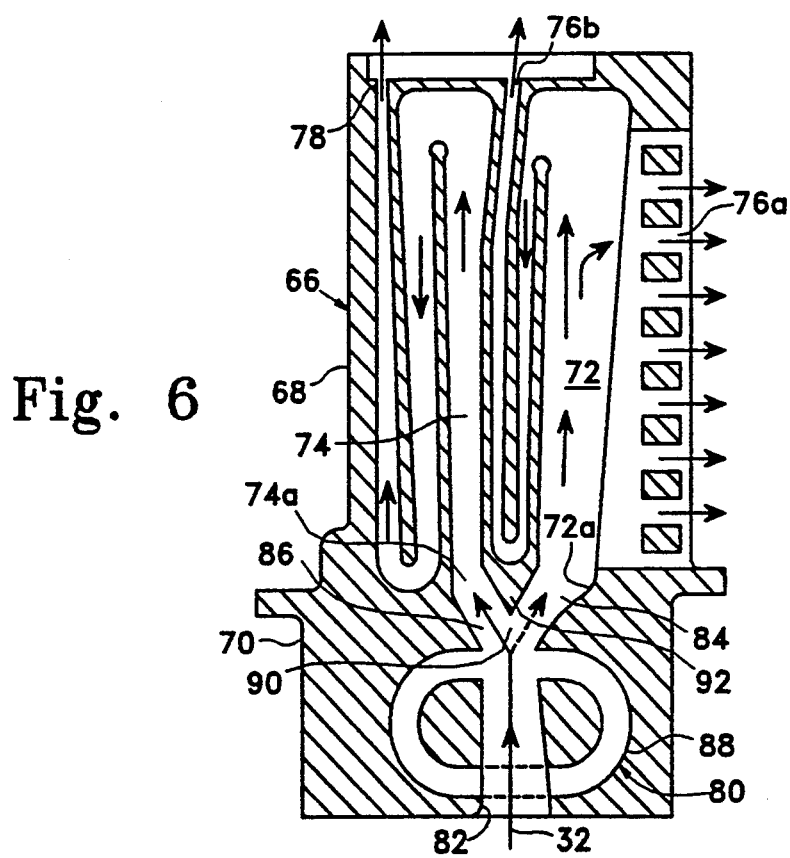
FIG. 6 is a sectional view of a rotor blade of the gas turbine engine illustrated in FIG. 1 having a fluidic oscillator therein in accordance with another embodiment of the present invention.

Illustrated schematically in FIG. 6 is another embodiment of the present invention in the form of a rotor blade 66 which may be used in either the HPT 24 or the LPT 26 illustrated in FIG. 1. The rotor blade 66 includes an airfoil 68 and an integral shank 70 extending therefrom having a suitable dovetail (not shown) for joining the blade 66 to the rotor disk of the turbine 24 or 26. The airfoil 68 includes two independent internal flow channels, i.e. a first channel 72 and a second channel 74, each being a serpentine channel, for example. The first channel 72 includes an inlet 72a at a radially inner end, and the second channel 74 also includes an inlet 74a at its radially inner end. The first channel 72 discharges the cooling air 32 through outlets in the form of trailing edge outlets 76a and a tip outlet 76b. The second channel 74 in this exemplary embodiment includes a tip outlet 78 for discharging the cooling air 32 from the second channel 74.

In this exemplary embodiment, a fluidic oscillator 80 is integrally formed or disposed inside the shank 70 and includes an inlet 82 which receives the compressed air 32 through the rotor disk, and first and second outlets 84 and 86 joined in flow communication with respective ones of the two flow channels 72 and 74. The oscillator 80 further includes an annular feedback loop or flow channel 88 disposed in flow communication between the inlet 82 and the first and second outlets 84 and 86. The feedback channel 88 may be circular, or racetrack-shaped as illustrated, for receiving a portion of the cooling air 32 from a switching zone 90 defined at the juncture of the inlet 82, feedback channel 88, and first and second outlets 84 and 86, which define therebetween a flow splitter 92. The oscillator 80 is identical in function to the oscillator 46 described above and is effective for alternately channeling the cooling air 32 to the first and second flow channels 72 and 74 for pulsing the cooling air 32 thereto while sharing the cooling air 32 therebetween.

In the several embodiments described above, the fluidic oscillators have no moving parts and are effective for pulsing and alternating the cooling air 32 between the two respective outlets for improving convective heat transfer coefficients inside the respective airfoils with reduced amounts of the cooling air 32. The oscillators may be suitably sized for channeling the required flowrates of the cooling air 32 at a pulsation frequency preferably greater than about 2,000 Hertz through the respective airfoils for obtaining a suitable backflow margin which prevents unacceptable bleed down of the cooling air within the airfoils. The airfoils may either be smooth inside or may include conventional turbulators or other heat transfer enhancement techniques as desired for further increasing convective enhancement. The pulsation frequency is preferably selected to provide a suitable margin from the natural frequencies of the airfoils 36 to prevent undesirable resonant vibration thereof.

Figure 7:
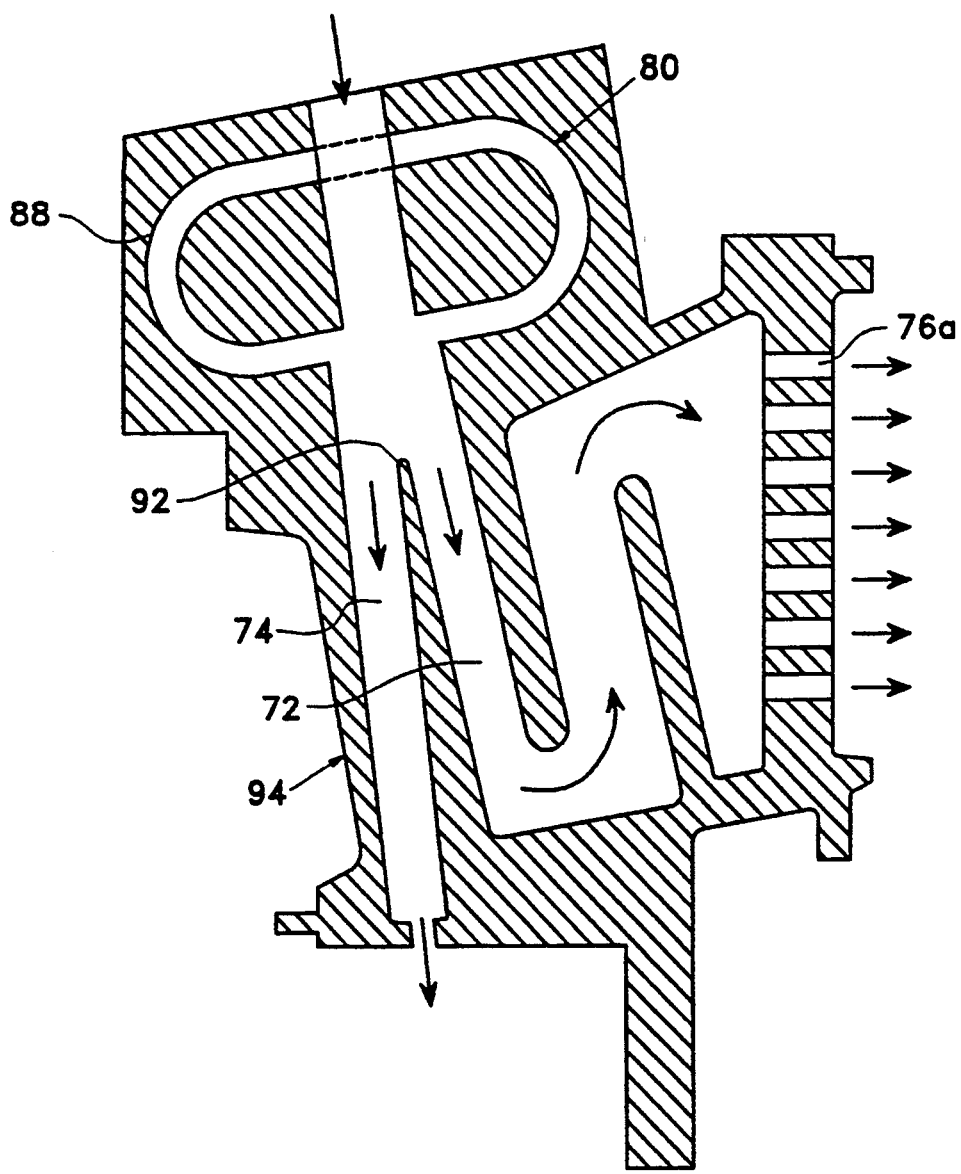
FIG. 7 is a sectional view of a stator vane including a fluidic oscillator in accordance with another embodiment of the present invention.

The fluidic oscillators of this invention may be applied to various parts, besides rotor blades and stator vanes, which require cooling. For example, stator casings, shrouds, and shroud supports (not shown) may be configured with fluidic oscillators for providing cooling thereof. And, the two-circuit or two-flow channel embodiment illustrated in the FIG. 6 rotor blade 66 may also be applied to a stator vane 94 such as the vane 36 illustrated in FIG. 2. The stator vane 94 may be configured, for example, as shown in FIG. 7, which includes substantially the same components as illustrated in FIG. 6, but applied to a stator vane.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A pulse-cooled gas turbine engine assembly comprising:

two hollow parts each having:
an internal flow channel;
an inlet for receiving pressurized cooling air for flow through said flow channel; and
a plurality of outlets extending through said part in flow communication with said flow channel for discharging said cooling air therefrom, each of said part outlets being sized for providing a predetermined pressure drop thereacross; and a fluidic oscillator having:
an inlet for first receiving said cooling air; and
first and second outlets joined in flow communication with respective flow channel inlets of said two hollow parts for intermittently discharging thereto said cooling air for cooling said parts; and said fluidic oscillator being sized and configured for alternately channeling said cooling air to said two parts at a predetermined pulsation frequency of said cooling air selected to prevent bleed-down of pressure of said cooling air in said flow channels of said parts below a predetermined backflow margin.

2. An assembly according to claim 1 wherein said first and second fluidic oscillator outlets are each in the form of a manifold, with each manifold being disposed in parallel flow communication with a plurality of said parts.

3. An assembly according to claim 1 wherein said fluidic oscillator further comprises:
an annular feedback flow channel disposed in flow communication between said oscillator inlet and said first and second outlets;

a flow splitter disposed at a juncture of said first and second outlets and said feedback channel; and said oscillator inlet being positioned for discharging said cooling air toward said splitter for effecting said alternating flow between said first and second outlets at said pulsation frequency and for channeling a portion of said cooling air alternately clockwise and counterclockwise in said feedback channel.

4. An assembly according to claim 3 wherein each of said parts is in the form of an airfoil of a stator vane, and said fluidic oscillator is fixedly joined in flow communication to one end thereof.

5. A pulse-cooled gas turbine engine assembly comprising:

a hollow part having:

two internal flow channels and respective inlets for receiving pressurized cooling air for flow therethrough; and a plurality of outlets extending through said part in flow communication with said flow channels for discharging cooling air therefrom, each of said part outlets being sized for providing a predetermined pressure drop thereacross; and a fluidic oscillator having:

an inlet for first receiving said cooling air; and first and second outlets joined in flow communication with respective ones of said two flow channels; and said fluidic oscillator being sized and configured for alternately channeling said cooling air to said two flow channels at a predetermined pulsation frequency of said cooling air selected to prevent bleed-down of said cooling air in said flow channels below a predetermined backflow margin.

6. An assembly according to claim 5 wherein said fluidic oscillator further comprises:

an annular feedback flow channel disposed in flow communication between said oscillator inlet and said first and second outlets;

a flow splitter disposed at a juncture of said first and second outlets and said feedback channel; and said oscillator inlet being positioned for discharging said cooling air toward said splitter for effecting said alternating flow between said first and second outlets at said pulsation frequency and for channeling a portion of said cooling air alternately clockwise and counterclockwise in said feedback channel.

7. An assembly according to claim 6 wherein said part is in the form of a rotor blade having a shank extending from an airfoil, and said fluidic oscillator is disposed inside said shank.

8. An assembly according to claim 6 wherein said part is in the form of a stator vane.

* * * * *